UNITED STATES PATENT OFFICE.

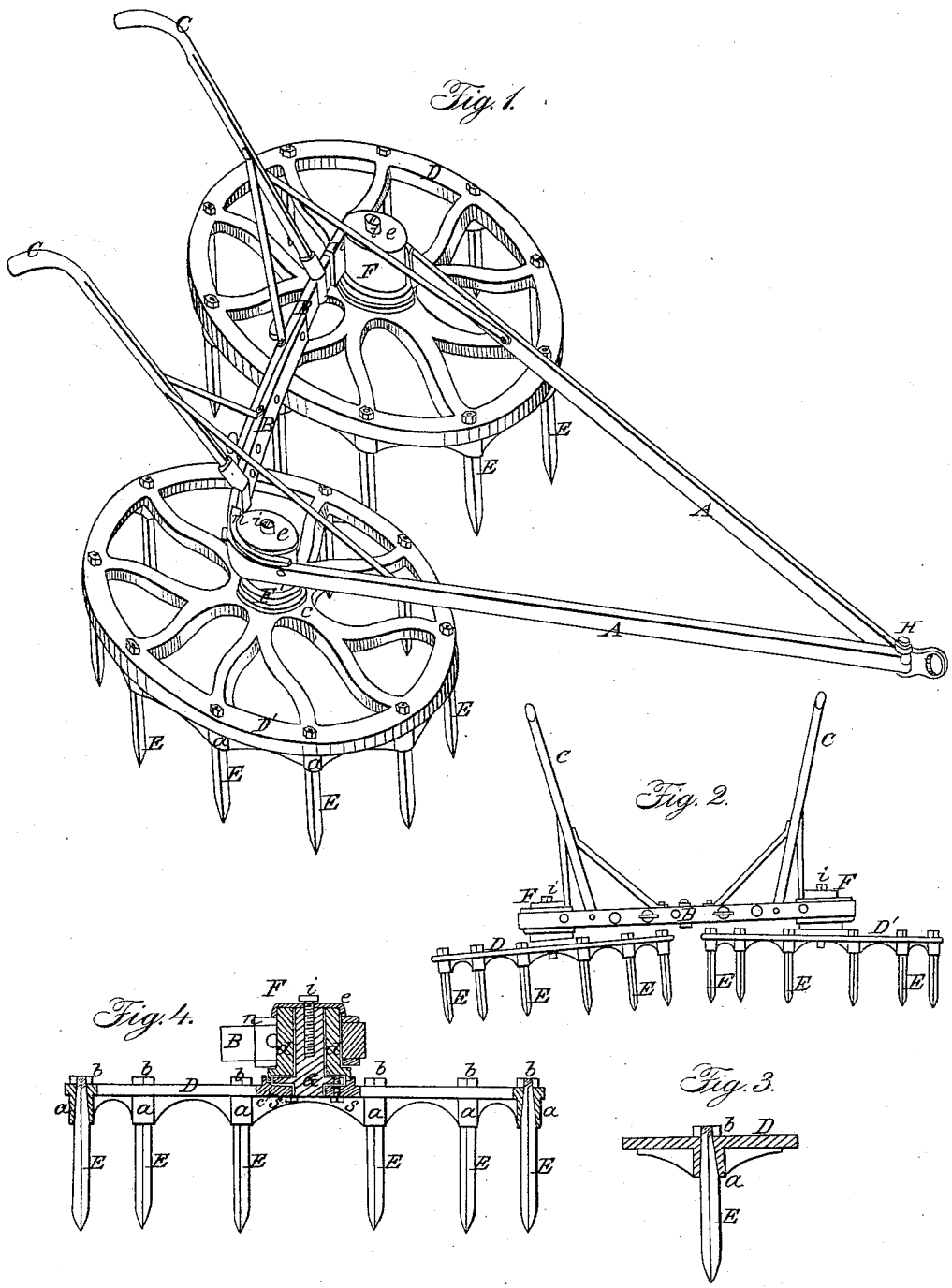

MARK W. HOUSE, OF CLEVELAND, OHIO.

IMPROVEMENT IN REVOLVING HARROWS.

Specification forming part of Letters Patent No. 22,651, dated January 18, 1859.

*To all whom it may concern:*

Be it known that I, MARK W. HOUSE, of Cleveland, in the State of Ohio, have invented certain Improvements in Rotating Harrows; and I do hereby declare the following to be a correct description of the same, reference being had to the accompanying drawings, in which—

Figure 1 is a perspective view of my improved harrow. Fig. 2 is a rear view. Fig. 3 is a detail view, showing the mode of attaching the tooth; and Fig. 4 is a vertical section of one of the wheels or harrows, showing the mode in which the harrow is attached to the frame.

The same part is indicated by the same letter in all the figures.

The nature of my invention consists in the mode, hereinafter particularly described, of making the connection between the wheels of the harrow and the frame.

In the drawings, A marks the frame of the harrow; B, the sliding adjustable arcs; D D′, the wheels; E, the teeth; F F′, the axle-boxes; G, the spindle; H, the hinge at the clevis; $a$, socket for teeth; $b$, nut to secure teeth; $c$, rim for reception of lower part of axle-box; $d$, body of axle-box; $e$, cap of spindle and axle-box; $i$, screw attaching cap $e$ to spindle G; $n$, braces through which axle-boxes are bolted to frame; $s\ s$, bolts attaching spindle to disk of wheel.

I make the whole implement of iron. The frame is hinged at the clevis H, and has two sliding arcs, B, for adjusting the distance between the wheels D D′ of the harrow. Attached to these arcs are the handles C C, by which the harrow is controlled. The wheels are similar in general construction and appearance to those of ordinary rotary harrows; but the teeth E are attached in a novel manner, as shown in Fig. 3. I make the body and shank of the tooth tapering, as shown, cutting a screw-thread at top for the reception of a nut, $b$. The tooth thus formed is received by a socket, $a$, of shape corresponding to that of the tooth. This arrangement enables the tooth to be tightened as it wears by means of nut $b$, and to be removed and replaced at pleasure.

The wheels D D′ are attached to the frame by means of the axle-boxes F and the spindle G, constructed and arranged as shown in section in Fig. 4, where $c$ is that part of the disk of the wheel through which the spindle G passes, and to which it is fastened by the bolts or screws $s\ s$. This part $c$ has a rim projecting up from it. The spindle G has a flange, which rests upon $c$, as shown, and through which the bolts $s\ s$ pass to attach the spindle to the wheel. This flange is just wide enough to leave a space or groove between its edge and the rim of $c$, as shown. Into this space or groove a rim at the bottom of the body $d$ of the box is received. In the central axis of spindle G a female screw-thread is cut for the reception of screw $i$, as seen in the figure. This screw confines the cap $e$ on top of the spindle G and the box $d$. This construction has the advantage of excluding all dirt and grit, which would enter and wear the spindle and obstruct its operation. It has the further advantage that the spindle can be removed and renewed whenever from any cause it becomes desirable.

The frame A is horizontal, and the inclination from the vertical of the axes of the wheels (shown in Fig. 2) is produced by setting the axle-boxes on the frame at an inclination by making the braces $n$ thicker at the bottom than at the top.

Having thus fully described my invention, what I claim, and desire to secure by Letters Patent, is—

The combination, with the spindle of a revolving harrow, of the cap $e$ and box $d$, for the purpose and substantially in the manner described.

In testimony whereof I have hereunto set my hand this 22d day of December, A. D. 1858.

MARK W. HOUSE.

Witnesses:
 FRED FICKEY, Jr.,
 CHAS. F. STANSBURY.